United States Patent [19]

Janz et al.

[11] 4,456,644
[45] Jun. 26, 1984

[54] CUSHIONING BODY FOR THE INTERIOR OF A VEHICLE, OR THE LIKE

[75] Inventors: Joachim Janz; Helmut Henne, both of Wuppertal, Fed. Rep. of Germany

[73] Assignee: Gebr. Happich GmbH., Fed. Rep. of Germany

[21] Appl. No.: 344,354

[22] Filed: Feb. 1, 1982

[30] Foreign Application Priority Data

Feb. 2, 1981 [DE] Fed. Rep. of Germany ....... 3107760

[51] Int. Cl.³ .............................................. B32B 3/12
[52] U.S. Cl. .................................. 428/158; 280/751; 296/31 P; 296/153; 428/139; 428/140; 428/159; 428/285
[58] Field of Search ............... 428/158, 159, 285, 139, 428/140; 280/751; 296/31 P, 153, 214

[56] References Cited

U.S. PATENT DOCUMENTS 2,088,709 8/1937 Lejuste .................................. 296/44

FOREIGN PATENT DOCUMENTS

| 36111 | 10/1970 | Australia . |
| 852182 | 9/1970 | Canada . |
| 1238795 | 4/1967 | Fed. Rep. of Germany . |
| 1555806 | 7/1970 | Fed. Rep. of Germany . |
| 1655624 | 8/1971 | Fed. Rep. of Germany . |
| 2408238 | 8/1979 | Fed. Rep. of Germany . |
| 2906288 | 8/1980 | Fed. Rep. of Germany . |
| 2261898 | 9/1975 | France . |
| 1053360 | 12/1966 | United Kingdom . |

*Primary Examiner*—George F. Lesmes
*Assistant Examiner*—P. R. Schwartz
*Attorney, Agent, or Firm*—Ostrolenk, Faber, Gerb & Soffen

[57] ABSTRACT

The invention concerns a cushioned body for use in the interior of automotive vehicles, such as an armrest. A generally flat cushioning body comprised of elastic foam plastic has a stiffening insert imbedded in it. The stiffening insert is in the form of a mat, like a fiberglass cloth. Two rows of integral projections project from one surface of the cushioned body, and the projections include foamed sections of the stiffening insert. The projections along opposite longitudinal edges of the body are bent outward, oppositely to each other for facilitating securement of the cushioning body. Stiffening stop projections are placed on the inwardly facing sides of the projections in one row. As appropriate, the cushioned body is bent, for covering over a bent vehicle body section, as in an armrest, or the like.

12 Claims, 4 Drawing Figures

U.S. Patent  Jun. 26, 1984  4,456,644
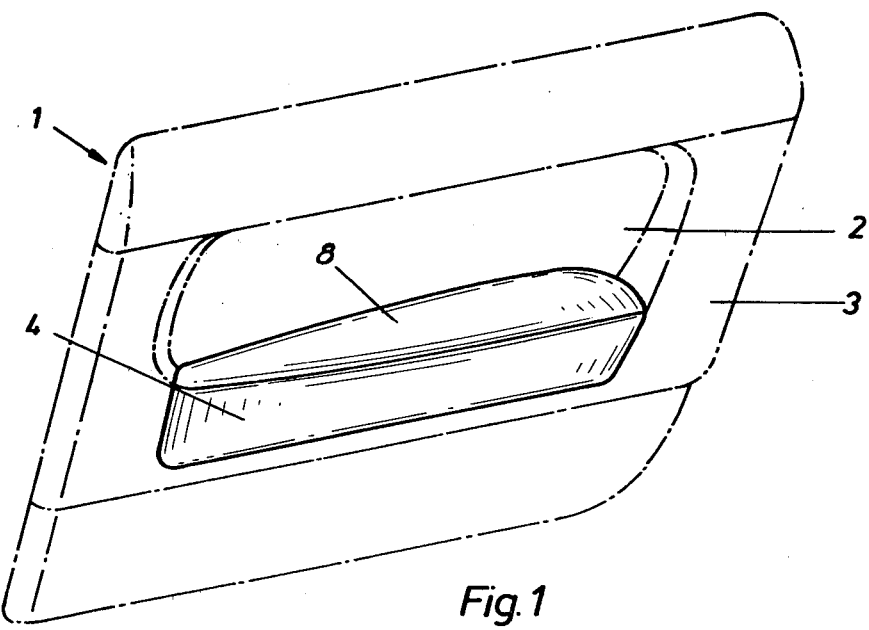
Fig. 1
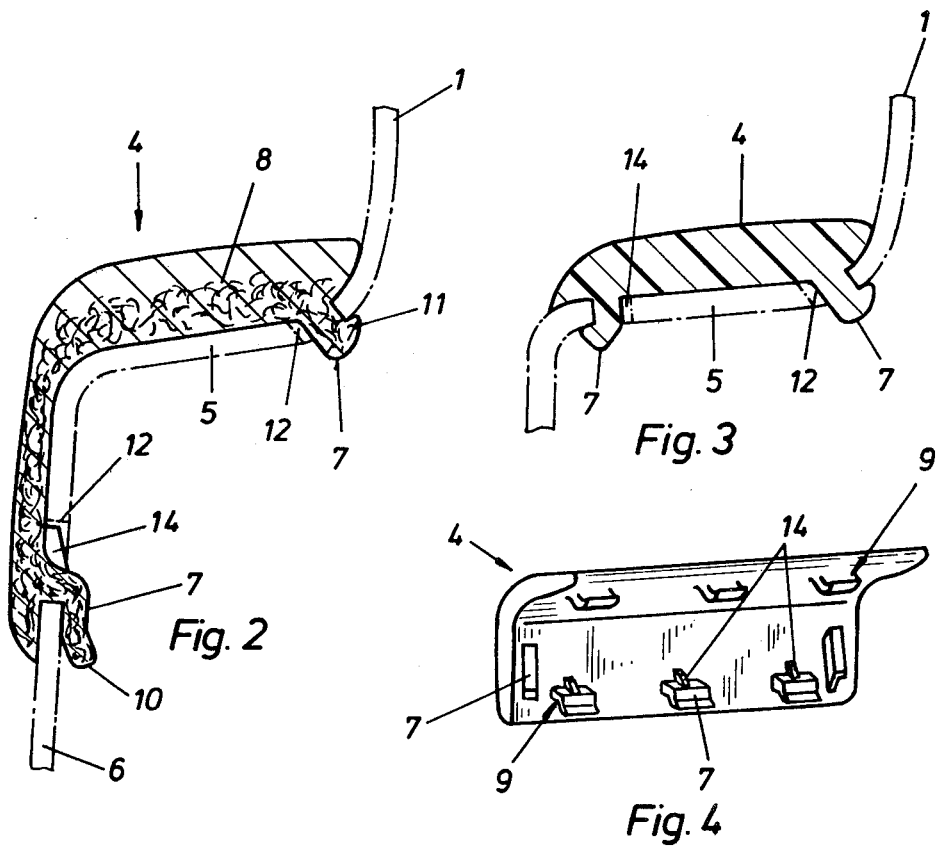

CUSHIONING BODY FOR THE INTERIOR OF A VEHICLE, OR THE LIKE

BACKGROUND OF THE INVENTION

The invention relates to a cushioning body for use, for instance, in an automotive vehicle, like an armrest. There are various cushioning bodies for the interiors of automotive vehicles, such as armrests, padded bodies, or the like. These bodies generally include an insert of dimensionally stable material which stiffens them. As shown, for instance, in German Pat. No. 24 08 238, the insert is frequently provided with a fastening element which protrudes beyond the junction plane of the cushioning body. This provides a provisional attachment of the cushioning body to the vehicle body. The cushioning body is finally fastened by screws secured into the part of the vehicle body, and the screw heads rest against the dimensionally stable insert. Equipping traditional cushioning bodies with their fastening elements is just as difficult, laborious and thus expensive as is applying the cushioning bodies to portions of the vehicle bodies.

SUMMARY OF THE INVENTION

The object of the present invention is to provide a cushioning body which is particularly simple to manufacture and to install in an automotive vehicle.

The invention is directed to a cushioning body for use in the interior of automotive vehicles, or the like, such as an armrest. The cushioning body is an elastic foam body of plastic material. A stiffening insert is imbedded in the body. That insert is in the form of a mat imbedded in the foamed material and particularly that mat may be developed in the form of a fiberglass cloth.

A plurality of integral projections are formed with the body and project from one of the large surfaces of the body and out of the plane of that surface. The stiffening insert is included in these integral projections and these integral projections include foamed sections of the insert. The inserts are positioned to be received in insert receiving openings in the vehicle body for securing the cushioning body to the vehicle body. With the invention, all fastening elements may advantageously be formed integrally with the cushioning body in a single operation. The required stability of the fastening elements is assured by incorporating a region of the stiffening insert within each fastening element. The mounting of the cushioning body is also eased since instead of cumbersome screw fastening, or the like, it is merely necessary to insert and/or clip the fastening elements into corresponding insertion openings in the vehicle body. Since the fastening elements consist essentially of foamed plastic, clipping them in position does not present any problems.

While the stiffening inserts of conventional cushioning bodies generally consist of a dimensionally stable material, the invention provides an insert in the form of a mat. It has been found particularly advantageous to develop the mat as a fiberglass cloth. Experiments have shown that, evidently due to the interlacing of the mat with the foam plastic, this mat strengthens the cushioning body, and in particular also the fastening elements, to an extent sufficient for all technical requirements.

For producing the cushioning body, tabs are merely cut into the material of the stiffening insert or mat. They form the inserts for the fastening elements. The mat is placed in a bottom mold and the foaming is then effected in the customary manner. Surprisingly, the stiffening insert mat does not float to any substantial extent in the foaming mold during the foaming process but remains in the rear region of the cushioning body and produces the required strength.

As further features of the invention, the cushioning body is a generally flattened body and the projections are all from one of the enlarged sides of the body. The cushioning body has two opposite longitudinal edges. One respective row of the projections is generally adjacent to each of the longitudinal edges. The projections are bent or angled oppositely to each other for facilitating non-removable attachment of the cushioning body. In particular, the projections of one row thereof are suspension tabs, while the projections of the other row thereof are clip members. To stiffen the suspension tabs, and to prevent their bending so as to release the cushioning body from the vheicle body, the bases of the suspension tabs are provided with respective stop projections for resting against an edge of an insertion opening in the vehicle body, and the stop projections are located at the sides of the suspension tabs toward the other row of projections. Where the cushioning body is used to cover over a bend in the vehicle body, as at an armrest, the cushioning body is appropriately bent, e.g. it is bent at a right angle. The projections are at the inside of the bend so as to be fastened to the vehicle body.

Other objects and features of the invention will be described below with reference to illustrative embodiments shown in the drawings.

BRIEF DESCRIPTION OF THE DRAWINGS

FIG. 1 shows a door covering having a cushioning body.

FIG. 2 is a partial vertical section through the door covering with the cushioning body shown in FIG. 1.

FIG. 3 is a partial section similar to that of FIG. 2 in which the cushioning body is modified.

FIG. 4 is a perspective view of the rear of the cushioning body of FIG. 2.

DESCRIPTION OF THE PREFERRED EMBODIMENTS

FIG. 1 shows a door panel having an inward depression 2 and an outward bulge 3. The door panel 1 is comprised of a pre-shaped plate of compressed cardboard, or the like, which is of relatively high flexural strength. In the region of the outward bulge 3, a cushioning body is provided, which is developed here as armrest 4. The armrest 4 has a substantially right-angle cross-sectional profile (FIG. 2), one arm of the armrest lying on a bent-off, approximately horizontal section 5 of the outward bulge 3 of the door panel 1 and the other arm of the armrest resting on a substantially vertically extending wall surface 6 of the door panel 1.

The armrest 4 is formed of foam plastic and is a generally flattened body that is provided with fastening elements 7 on its rear large surface. This cushioning body 4 is a single piece unit and is integral with its fastening elements 7.

The cushioning body 4 is stiffened by an insert comprised of a mat 8 developed predominantly as a fiberglass cloth, and the mat also extends into the fastening elements 7.

The fastening elements 7 are developed as projections, arranged in two rows, each in the vicinity of one of the substantially parallel, longitudinally extending, opposite edges of the cushioning body. As can be noted particularly from FIGS. 2 and 4, there are two rows of projections 9, each consisting of a plurality of projections arranged alongside of each other in the respective row (see FIG. 4). The projections along one row of projections 9 are developed as suspension tabs 10 and the projections along the other row of projections are developed as clip members. The projections are bent in shape and have their respective bends directed opposite to each other.

Upon the mounting of the cushioning body, in the present case the armrest 4, the suspension tabs 10 of the row of projections 9 are first hung in their corresponding insertion openings 12. Then, after slightly turning the cushioning body, clip members 11 are inserted and clipped into their corresponding insertion openings 12. Due to the re-entrant angles formed by the oppositely directed bends of the suspension tabs 10 and clip members 11, the cushioning body is dependably fastened.

Any possible lifting or shifting of the cushioning body is effectively prevented by stop projections 14 which are developed on that side of the suspension tabs 10 that is opposite the bends, i.e. the side facing toward the clips 11. These projections 14 rest against the edges of the corresponding guide insertion openings 12 in the vehicle body.

As shown in FIG. 4, additional fastening elements 7 can also be developed on the end regions of the cushioning body.

In the embodiment shown in FIG. 3, there is a cushioning body, which is also developed as an armrest 4. But, the armrest has no vertically extending portion. The same conditions described above apply with respect to the arrangement and development of this cushioning body, especially with regard to the fastening elements 7 thereof.

The fastening elements 7 are of relatively large size as compared, for instance, with screws. Due to their large size, correspondingly large resting surfaces are obtained so that the cushioning bodies can be applied also to parts or coverings of car bodies in which screws would not adequately hold.

Although the present invention has been described in connection with a plurality of preferred embodiments thereof, many variatons and modifications will now become apparent to those skilled in the art. It is preferred, therefore, that the present invention be limited not by the specific disclosure herein, but only by the appended claims.

What is claimed is:

1. A cushioned body for the interior of automotive vehicles, or the like, comprising:

an elastic foam plastic body having length and width dimensions; a continuous stiffening insert imbedded in the body; the insert being in the form of a mat; a plurality of integral projections on the foam plastic body; each projection being narrower than the body along the length and width dimensions of the body, the projections being comprised of the same elastic foam plastic as the body; the projections including sections of the continuous stiffening insert mat therein and those sections including the foam plastic thereover; the projections protruding out of the plane of a surface of the cushioned body.

2. The cushioned body of claim 1, wherein the mat comprises a fiberglass cloth.

3. The cushioned body of claim 1, wherein the cushioned body has two opposite longitudinal edges; two rows of projections, each comprised of a plurality of the projections, and a respective one of the rows being developed adjacent to and along each longitudinal edge.

4. The cushioned body of either of claims 1 or 3, wherein all the projections project from the surface at one side of the body.

5. The cushioned body of claim 3, wherein the body is generally flattened and the projections project from the surface at a larger side of the flattened body.

6. The cushioned body of claim 3, wherein the longitudinal edges are substantially parallel; the body having opposite ends joining the longitudinal edges, and the ends being generally rounded.

7. The cushioned body of claim 3, wherein the projections of one row are suspension tabs and the projections of the other row are clip members, and the projections of the two rows have oppositely directed angular bends for facilitating securement of the cushioned body.

8. The cushioned body of claim 7, wherein the suspension tab projections include respective bases at the body; a stop projection for resting against an edge of an insertion opening for the suspension tab, is provided at the base of each suspension tab and at that side of the suspension tab that is toward the other row of projections.

9. The cushioned body of claim 1, wherein the cushioned body is bent at an angle across one of its dimensions.

10. The cushioned body of claim 9, wherein the projections are at the inward side of the bend in the body.

11. The cushioned body of claim 9, wherein the cushioned body is bent generally at a right angle.

12. The cushioned body of claim 3, wherein the cushioned body is bent at an angle across one of its dimensions.

* * * * *